(12) United States Patent
Babcock et al.

(10) Patent No.: US 7,491,293 B2
(45) Date of Patent: Feb. 17, 2009

(54) WHITE TOP PAPERBOARD

(75) Inventors: Bruce W. Babcock, Charleston, SC (US); Tricia W. Thomas, Ringgold, GA (US)

(73) Assignee: MeadWestvaco Corporation, Stamford, CT (US)

(*) Notice: Subject to any disclaimer, the term of this patent is extended or adjusted under 35 U.S.C. 154(b) by 415 days.

(21) Appl. No.: 11/227,769

(22) Filed: Sep. 15, 2005

(65) Prior Publication Data

US 2006/0065379 A1    Mar. 30, 2006

(51) Int. Cl.
*D21F 11/00* (2006.01)
(52) U.S. Cl. .................. 162/125; 162/181.1; 162/168.1; 162/169; 428/508; 428/535
(58) Field of Classification Search ............... 162/125, 162/141, 124, 128, 181.1, 158, 168.1, 169, 162/181.2, 181.4; 428/153, 34.2, 34.6, 35.6, 428/508, 535
See application file for complete search history.

(56) References Cited

U.S. PATENT DOCUMENTS

2004/0168779 A1 *  9/2004  Silenius et al. .............. 162/124

FOREIGN PATENT DOCUMENTS

WO          02/092910       * 11/2002

* cited by examiner

*Primary Examiner*—Mark Halpern
(74) *Attorney, Agent, or Firm*—Warunee Srisiri; Neil G. Cohen

(57) ABSTRACT

A multi-layered paperboard having a high brightness and exceptional uniformity. The white topped paperboard has a base layer(s) made from wood pulp and a top fibrous layer made of unbleached wood fiber, filler and a binder to create a top fibrous layer of sufficient uniformity at moderate brightness levels. The top fibrous layer optionally contains a coagulant and/or a retention aid. In a preferred embodiment, the top fibrous layer of the multi-layered paperboard product is coated with a coating of additional fillers and binders to produce the desired level of brightness and uniformity. The invention also includes a process for making a multi-layered paperboard.

19 Claims, 3 Drawing Sheets

WHITE TOP PAPERBOARD

BACKGROUND OF THE INVENTION

1. Field of the Invention

Figure 1:
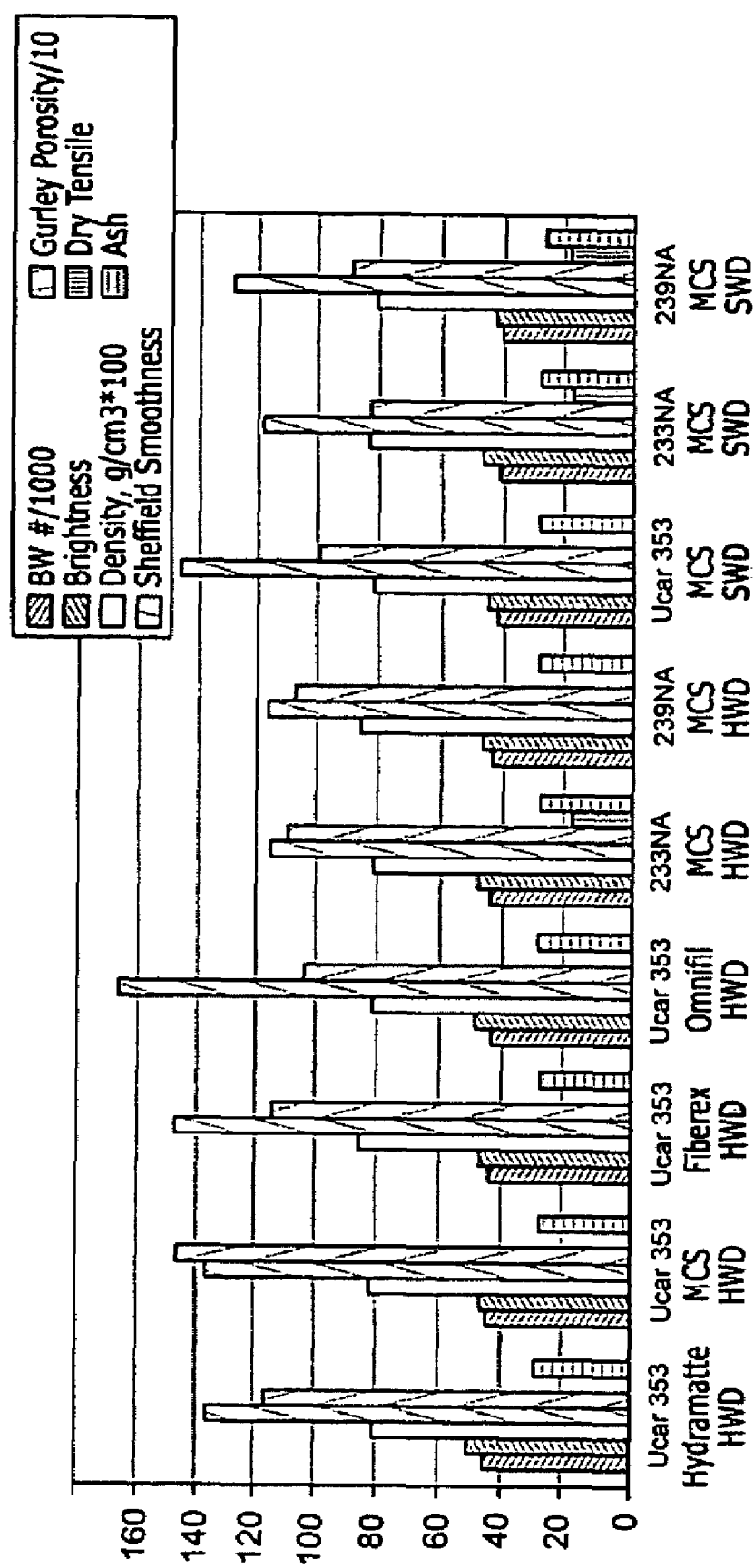

This invention relates to a multi-layered white top paperboard and to a method for making same. More particularly, this invention relates to multi-layered paperboard having a base layer(s) of unbleached fiber and a highly filled white top layer having a coating to achieve over 65% GE brightness and exceptional uniformity and to a method for making same.

2. The Prior Art

For many years filled white topped papers have been produced. Thus, it is conventional to add fillers to pulp fibers when making paper to improve the opacity, whiteness, printability of the paper and to reduce the cost of the paper because fillers are normally cheaper than the cellulose fibers which they replace. The problem is that fibers are expensive and retention of sufficient fillers is difficult.

It is also known to produce highly filled sheets of paper with water-insoluble, organic polymers to help retain the finely-divided, substantially water-insoluble, non-fibrous, inorganic filler on the fiber. However, the retention of fillers in the sheet during formation is a significant problem. Also, it is known that increasing filler content progressively reduces sheet strength because the filler particles interfere with the potential development of fiber-to-fiber bonds and occupy spaces that might otherwise have contained fibers.

In the paperboard area, current methods of manufacturing white top paperboard and folding carton boards employ either bleached pulp fibers in a separately formed top ply or multiple stages of coatings with pigments and binders. These approaches have the disadvantages of higher cost materials, negative environmental impact for chemically bleached fiber and large capital costs and costs for multiple forming sections and multiple coating and re-drying equipment for the coated process.

BRIEF SUMMARY OF THE INVENTION

The present invention provides a multi-layered paperboard having a high brightness and exceptional uniformity. Broadly speaking, the white topped paperboard of this invention has a base layer(s) made from wood pulp that may be chosen from various types and mixtures and a top fibrous layer made of unbleached wood fiber, inorganic filler and a polymer-based binder to create a uniform layer at moderate brightness levels. The top fibrous layer optionally contains a coagulant and/or a retention aid. In a preferred embodiment, the top fibrous layer of the multi-layered paperboard product is coated with a single application of a relatively low cost coating of additional fillers and binders to produce the desired level of brightness and uniformity. The use of the novel top fibrous layer in conjunction with a single coating significantly reduces the material, capital and operational costs required to produce the invention product as compared to the multiple applications of coating needed to produce coated unbleached paperboard using previously known methods.

The preferred process for making the products of this invention is particularly adaptable to being carried out on continuous paper-making equipment such as a Fourdrinier machine, a cylinder machine, suction machines such as a Rotaformer, or on millboard equipment. Suitable also in the practice of this invention are other well-known modifications of such equipment, for example, a Fourdrinier machine with secondary headbox or multi-cylinder machines in which, if desired, different furnishes can be used in the different cylinders to vary the composition and properties of one or more of the several layers, which can comprise the finished paperboard.

The top fibrous layer involves adding the filler to a fiber slurry at approximately 3% consistency, then adding with continuous mixing the latex followed by a coagulant, if desired, to form a second furnish. The coagulant assists the filler precipitate onto the fibers, held in place by the latex. A retention aid may be added to the headbox with the top fibrous layer furnish to retain any loose filler in the top fibrous layer. The paper is dried and may be calendered. In the preferred method the multi-layered paperboard is then coated, preferably with a non-contact coater.

It is a general object of the present invention to provide a multi-layered white topped paperboard and in one embodiment a paperboard having exceptional uniformity and a GE brightness of at least 65%.

Another object of the invention is to provide a process for making a white topped paperboard product.

Other objects, features and advantages of the invention will be evident from the following detailed description of the invention taken in conjunction with the drawings.

BRIEF DESCRIPTION OF THE SEVERAL VIEWS OF THE DRAWING(S)

Figure 2:
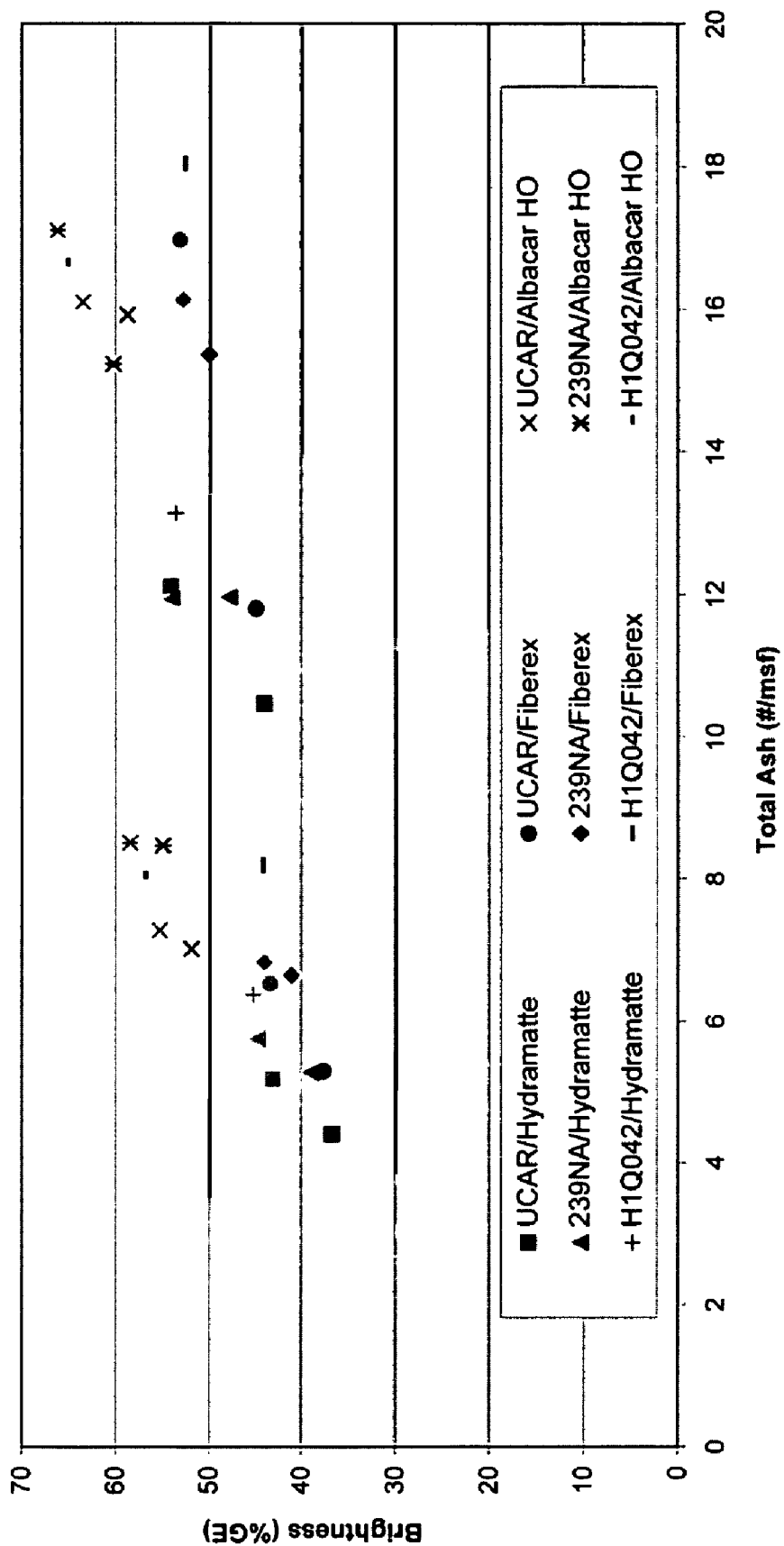
Figure 3:
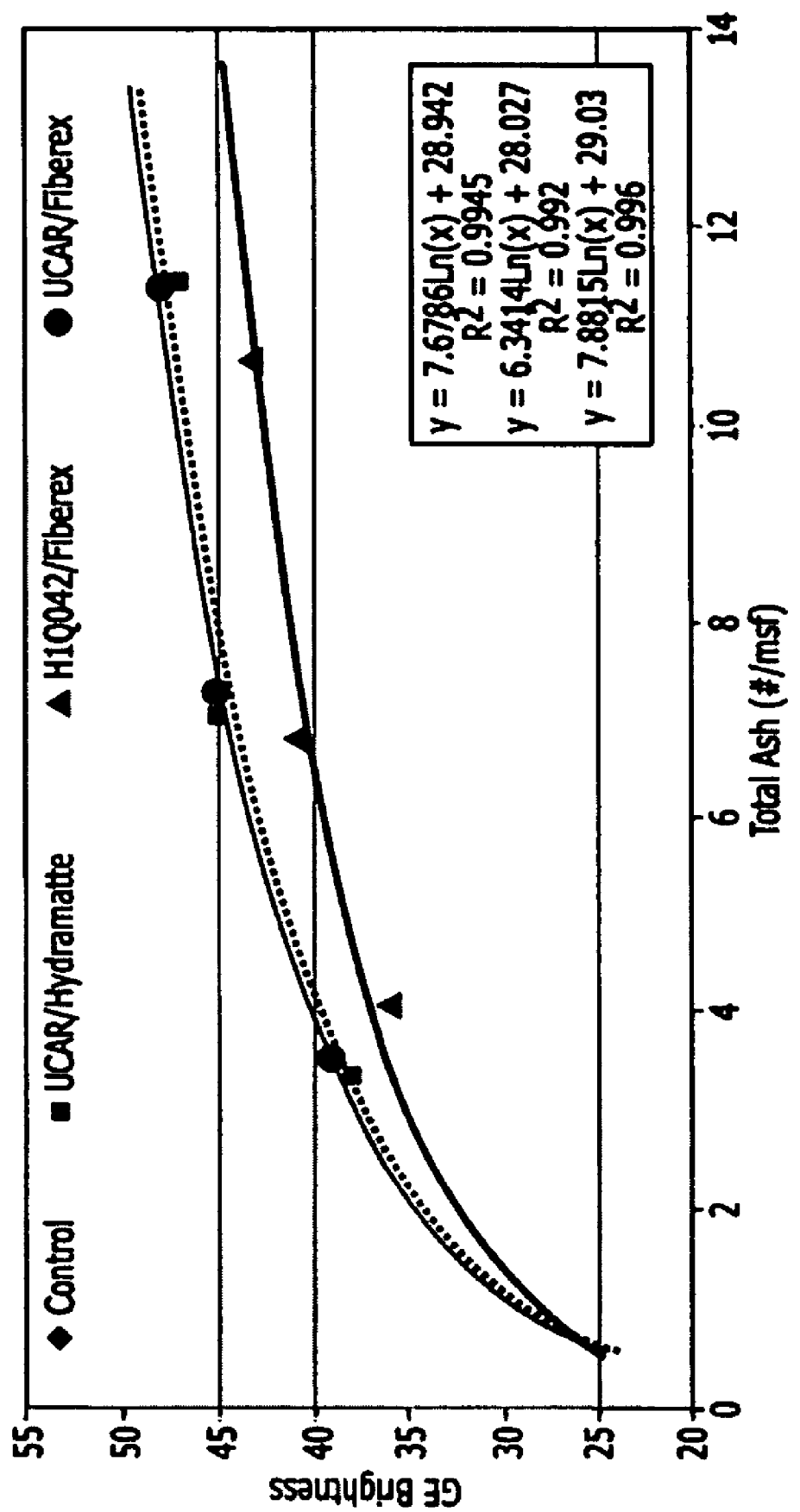

Having thus described the invention in general terms, reference will now be made to the accompanying drawings, which are not necessarily drawn to scale, and wherein:

FIG. 1 is a graph summarizing properties of the handsheets from Example 2;

FIG. 2 illustrates the brightness of handsheets made in Example 3 wherein the filled points are invention furnish containing hardwood pulp diluted with paper machine table water in the top fibrous layer; and the shaded points are invention furnish containing repulped unbleached kraft board diluted with paper machine table water; and FIG. 3 illustrates the increase in brightness with increased levels of retained filler of pilot trial sheets from Example 4.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements.

The invention provides a multi-layered paperboard having high brightness. The base layer(s) is made from wood pulp of various kinds such as mechanical pulp and chemical pulp, such as unbleached sulfite pulp, and unbleached kraft pulp and recycled paper and paperboard fibers. The pulp fibers may be softwood, hardwood, recycled paper fibers or mixtures thereof. In a preferred embodiment the base layer(s) is greater than 50% by dry weight of softwood fibers. The base layer(s) varies in basis weight from about 20 lbs/1000 sq. feet to about 100 lbs/1000 sq. feet, preferably from about 25 lbs/1000 sq. feet to about 60 lbs/1000 sq. feet. The majority of the strength of the paperboard product of this invention is from the base layer(s).

The top fibrous layer is a highly filled layer comprising pulp fiber, a filler and a binder. The top fibrous layer varies in weight from about 5 lbs/1000 sq. feet to about 17 lbs/1000 sq. feet, and preferably from about 8 lbs/1000 sq. feet to about 10 lbs/1000 sq. feet. The pulp fibers may be softwood or hardwood but are preferably a mixture of hardwood and softwood wherein at least 25% of the fibers are unbleached hardwood. The fiber serves as the backbone on which the latex and filler bond.

Fillers are used along with the fiber in the composition of the top fibrous layer and are incorporated during formation of the layer on the papermaking wire. This is achieved by having the filler present in suspension in the papermaking stock, so that as the stock is drained to the wire, suspended filler particles are retained in the resulting wet fibrous web. The fillers which are used in the practice of this invention are finely divided, essentially water insoluble, inorganic materials. The filler may be, for example, clay, calcium carbonate, talc, titanium dioxide, silica, zinc oxide, magnesium carbonate, magnesium hydroxide, aluminum silicate, magnesium silicate, diatomaceous earth, aluminum trihydrate and mixtures of these materials. The filler is included in the top fibrous layer in an amount from about 60% to about 90% by weight, preferably from about 63% to about 77% by weight, and most preferably, about 70% by weight.

The binder serves as part of the retention system by agglomerating the filler to the fiber surfaces during forming. The binder is included in the top fibrous layer in an amount from about 3% to about 10% by total weight of the top fibrous layer, preferably from about 4% to about 6% by weight. The binder serves to provide bonding within the assembly of fibers and filler particles. The binder may be a latex such as a styrene-butadiene-rubber latex, polyisoprene latex, vinyl acrylic latex, styrene acrylic latex, and derivatives thereof.

In addition, cationic starches such as quaternized potato starch may also be used as the binder.

In one of the embodiments of this invention the use of a coagulant or destabilizing agent (sometimes also called a deposition aid) is highly advantageous. Such coagulation agents are water-dispersible, preferably a water-soluble ionic compound or polymer, i.e., compounds or polymers having a positive or a negative charge. For the process, ordinarily a coagulant is chosen which has a charge opposite to the ionic stabilization of the latex. Sufficient coagulant is added to make the charge near neutral, preferably about 5 lbs to 100 lbs/ton of furnish (fiber, binder and filler) used in the top fibrous layer, most preferably about 30 lbs to about 70 lbs/ton. The coagulant causes the filler to be deposited onto the fibers, held in place by the coagulated latex. Representative coagulants are water-soluble, inorganic salts such as alum, aluminum sulfate, calcium chloride and magnesium chloride; starches with a charge opposite in sign to the binder, and ionic latex having a charge opposite in sign to that of the binder. One group of particularly preferred coagulants are charged polymers, such as polyquaternary amines. When the binder is a cationic latex, a coagulant is generally not used.

In addition, a retention aid may optionally be used. An example of such retention aids are positively or negatively charged polymers used in an amount of from 2 lbs to about 8 lbs/ton of top fibrous layer furnish (dry basis). An especially useful retention aid is an acrylamide/acrylate polymer used in the headbox with the top fibrous layer furnish to retain any loose filler in the top fibrous layer.

Multi-layered white topped products made as described above generally have at least a 40% GE brightness, usually 45-59% GE brightness. The GE Brightness as used herein is measured by Tappi test method T 452 om-02 entitled "Brightness of pulp, paper, and paperboard (directional reflectance at 457 nm)."

In a preferred embodiment of the invention, the paperboard product includes a additional layer of coating material coated onto the top fibrous layer. The coating is a mixture of filler and binder. The filler is present in an amount of from about 80% by weight to about 95% by weight of the coating, preferably from about 85% to about 90% by weight. The binder is present in an amount of from about 5% by weight to about 20% by weight of the coating, preferably about 10% to about 16%. If the coating is primarily composed of clay or carbonate, the coated paper may have a brightness of at least 65% GE.

The preferred process for making the products of this invention is particularly adaptable to being carried out on continuous paper-making equipment such as a Fourdrinier machine, a cylinder machine, suction machines such as a Rotaformer, or on millboard equipment. Suitable also in the practice of this invention are other well-known modifications of such equipment, for example, a Fourdrinier machine with secondary headbox or multi-cylinder machines in which, if desired, different furnishes can be used in the different cylinders to vary the composition and properties of one or more of the several layers, which can comprise the finished paperboard.

The top fibrous layer furnish involves adding the filler to a fiber slurry at a 2% to 5% consistency, preferably about 3% consistency, then adding the binder and optional coagulant. The coagulant causes the filler to be precipitated onto the fibers, held in place by the coagulated latex. A retention aid may also be added to the headbox with the top fibrous layer furnish to retain any loose filler in the top fibrous layer. The paperboard is dried and may be calendered.

In the preferred embodiment the multi-layered paperboard is coated. Any of the well-known coating methods may be used, such as blade coating, air-knife coating, curtain coating, or contour coating. It is preferred that the coater be a non-contact coater.

The following examples are provided to further illustrate the present invention and are not to be construed as limiting the invention in any manner.

EXAMPLE 1

Multi-layer paperboard handsheets were made using refined pine in the base layer. The top fibrous layer contained hardwood fibers (25%), Hydramatte® delaminated clay from Huber (70%) as the filler, and UCAR 353 vinyl acrylic latex from Union Carbide (5%) as the binder.

The sheets were all made with equal total weight in the base layer and the top fibrous layer (28.7 lb/1000 sq. ft. for each layer). The top fibrous layer was prepared by adding the filler to the fiber slurry at approximately 3% consistency, then adding, with continuous mixing, the latex, followed by a coagulant (Nalco 7607) (7 lb/ton). A retention aid, Nalco 7546 polymer (2.4 lb/ton), was then used in the handsheet mold with the top fibrous layer furnish to retain any loose filler in the top fibrous layer. These handsheets had brightness ranging from 53 to 59% GE and had excellent uniformity. Handsheets prepared using bleached fiber as the top fibrous layer were of similar brightness (Table 1).

The sheets were lightly calendered (200 pli, 125° F.) and were coated with a single application of coating using a pilot coater to simulate commercial coating. Results from two different coatings are shown in Table 1. Coating A was a mixture of Hydramatte® delaminated clay and UCAR 353 vinyl acrylic latex (70/5). Coating B was identical to Coating A except that titanium dioxide was substituted for 10% of the clay in the coating. The coated sheets had a remarkably uniform appearance and GE brightness over 77%; invention handsheets coated with Coating B reached 83% GE brightness. For comparison, commercially available coated unbleached kraft cartonboard had a brightness of only 78.6% GE even though it contained multiple coating layers and also had titanium dioxide in the coating. Sheet uniformity was measured by image analysis using a proprietary algorithm to calculate a uniformity index based on small-scale deviations in sheet brightness. Uniformity of the coated invention sheets was greatly improved as compared to the uniformity of identically coated handsheets prepared using bleached fiber (with no filler) as the top fibrous layer (Table 1).

Hydramatte® delaminated clay had the highest brightness. The use of softwood in the top fibrous layer resulted in slightly lower brightness and rougher surface than compa-

TABLE 1

Brightness and Uniformity of White Top Sheets

| | All-Fiber | | Commercial Products | |
|---|---|---|---|---|
| | Bleached Top Ply Handsheets | Invention Handsheets | Coated Unbleached Kraft Cartonboard | White Top Linerboard |
| Brightness (% GE) | | | 78.6 ± 0.5 | 77.2 ± 0.4 |
| Uncoated | 54.6 ± 0.7 | 57.0 ± 0.9 | | |
| Coating A, 12 gsm | 77.5 ± 0.6 | 78 | | |
| Coating B, 18 gsm | 81 | 83 | | |
| Uniformity Index | | | 1.1 ± 0.1 | 2.2 ± 0.3 |
| Uncoated | 23 ± 4 | 20 ± 1 | | |
| Coating A, 12 gsm | 10.6 ± 0.9 | 5.2 ± 0.4 | | |
| Coating B, 18 gsm | 9.2 | 2.1 | | |

Additional properties of the uncoated sheets with either a bleached fiber top layer or with the highly filled unbleached top layer were also characterized and are presented in Table 2. Of particular note is the higher porosity value (more closed sheet) for the prototype sample, which may contribute to the uniformity and brightness of the coated sheet.

rable sheets using hardwood in the top fibrous layer (Table 3). Ash data indicated total filler retention similar to sheets made with hardwood; localizing the filler in the surface layer was hypothesized to be more difficult with the longer softwood fibers and, therefore, more open top fibrous layer mat.

TABLE 2

Characterization of Two-Ply Uncoated Sheets

| | All-Fiber Bleached Top Ply Handsheets (Uncalendered) | Invention Handsheets (Uncalendered) | Invention Handsheets (Calendered) |
|---|---|---|---|
| Sheffield Smoothness | 387 | 378 | 174 |
| PPS S5 (μm) | 10.98 | 11.55 | 5.89 |
| PPS S10 (μm) | 8.94 | 9.45 | 5.05 |
| PPS S20 (μm) | 6.82 | 7.08 | 4.06 |
| L&W Porosity (sec/100 cc) | 15.1 | 44.6 | 95.9 |
| Technidyne Porosity (sec/100 cc) | Too low to measure | 51.9 | 101.8 |
| Water Absorption (g/m$^2$) | 281.1 | 378.7 | 361.7 |
| HST (sec to 80% reflectance) | 3.1 | 4.3 | 1.9 |
| Contact Angle at 1 Sec. (deg.) | 56.4 | 61.2 | 65.5 |
| Contact Angle at 10 Sec. (deg.) | 21.3 | 41.6 | 44.6 |

EXAMPLE 2

Multi-layer handsheets were prepared using the same basic approach and the same top fibrous layer basis weight as used in Example 1. Several sets of handsheets demonstrated the use of softwood fiber in the top fibrous layer instead of hardwood. The use of four fillers was also demonstrated: the Hydramatte® delaminated clay; Fiberex®, a low brightness clay (Huber, 70-75% GE brightness); MCS, a water washed filler clay from Engelhard; and Omnifil® clay (Huber, 79-84% GE brightness). Three latexes were used in this demonstration as well: the UCAR™ 353 from Example 1 and two Dow Reichhold carboxylated styrene butadiene latexes designed for wet end application, DL 233NA with a $T_g$ of 9° C. and DL 239 NA with $T_g$ of −7° C. There was no coating applied to these handsheets.

The handsheets produced ranged in brightness from 43 to 50% GE. The handsheets with the UCAR latex and the

TABLE 3

Hardwood vs. Softwood in the Top Fibrous Layer

| | Hardwood | Softwood |
|---|---|---|
| Fiber, 25% | | |
| Clay, 70% | MCS | MCS |
| Latex, 5% | UCAR 353 | UCAR 353 |
| Basis Weight (#/msf) | 44.6 | 43.1 |
| Brightness (% GE) | 47.2 | 46.1 |
| Density (g/cm$^3$*100) | 82.5 | 83 |
| Sheffield Smoothness | 137 | 147.5 |
| Gurley Stiffness (mg$_f$; 1.5" × 1.0" sample, 50 mg @ 2") | 1470 | 1010 |
| Dry Tensile | 22.56 | 20.40 |
| Ash | | |
| (%) | 27.5 | 29.2 |
| (#/msf) | 12.3 | 12.6 |

TABLE 4

Latex Comparison, Styrene-Butadiene Latexes

| Fiber, 25%<br>Clay, 70%<br>Latex, 5% | HWD<br>MCS<br>233NA | HWD<br>MCS<br>239NA |
|---|---|---|
| Basis Weight (#/msf) | 43.7 | 44.1 |
| Brightness % GE) | 48.18 | 46.8 |
| Density (g/cm$^3$*100) | 82.2 | 86.5 |
| Sheffield Smoothness | 116 | 118 |
| Gurley Stiffness (mg$_f$; 1.5" × 1.0" sample, 50 mg @ 2") | 1110 | 1090 |
| Dry Tensile | 18.46 | 21.05 |
| Ash | | |
| (%) | 28.2 | 28.6 |
| (#/msf) | 12.3 | 12.6 |

Of the two styrene butadiene latexes, the DL 239NA sheets had higher tensile (Table 4). Sheet properties are summarized graphically in FIG. 1.

EXAMPLE 3

In Example 3, handsheets were made using either hardwood or repulped unbleached kraft board in the top fibrous layer bonded over a base layer of softwood pulp. Repulped unbleached kraft board resulted in higher brightness, most likely because the pulp was essentially washed in the original process of forming the unbleached kraft board.

These handsheets used Hydramatte® delaminated clay, Fiberex® clay, or precipitated calcium carbonate (Albacar® HO, scalenahedral shape) as the filler portion. The precipitated calcium carbonate sheets gave the highest brightness. For latex, the UCAR 353 latex, the higher strength styrene butadiene latex, and a cationic vinyl acrylic latex (H1Q042 from Specialty Polymers, Inc., were used. The advantage of the cationic latex is the elimination of the coagulant, but care must be taken to dilute the latex prior to adding it to the pulp/filler mixture to assure an even reaction. Brightness with each of the three latexes was similar.

The handsheets in this example were made at either the same equal base layer and top fibrous layer weights (2 grams per layer, or 28.7 lb/1000 sq. ft. for each layer) or with the top layer weight cut in half (1 gram top layer, i.e., 28.7 lb/1000 sq. ft./base layer, 14.35 lb/1000 sq. ft. top layer). Cutting the top fibrous layer weight in half resulted in decreased brightness. Brightness results are summarized in FIG. 2.

EXAMPLE 4

This example illustrates a pilot machine run making the paperboard of the present invention. Fiber for the base layer was repulped unbleached linerboard. Repulped unbleached kraft board was used for the top fibrous layer fiber.

Several combinations of filler and latex were demonstrated. Delaminated clay (Hydramatte®) and Fiberex® clay were used, as were the UCAR 353 and cationic latexes. Top fibrous layer coverage was run as a ladder of three weights for each material combination. The results are shown in Table 5. The top fibrous layer coverage target was 5, 11, or 17 lbs/1000 sq. ft. of the total basis weight of 37.5 lb/1000 sq. ft. Brightness ranged from 39% GE for low coverage to 47% GE for high coverage. Brightness increased with increasing levels of retained filler, as indicated by ash measurements as shown in FIG. 3.

TABLE 5

Target Conditions for Pilot Trial

| Condition | Latex | Filler | Target Top Fibrous Layer Weight (lb/1000 ft$^2$) |
|---|---|---|---|
| 1 | None | None | 5 |
| 2 | None | None | 11 |
| 3 | None | None | 17 |
| 4 | UCAR | Hydramatte | 17 |
| 5 | UCAR | Hydramatte | 11 |
| 6 | UCAR | Hydramatte | 5 |
| 7 | Cationic | Fiberex | 17 |
| 8 | Cationic | Fiberex | 11 |
| 9 | Cationic | Fiberex | 5 |
| 10 | UCAR | Fiberex | 17 |
| 11 | UCAR | Fiberex | 11 |
| 12 | UCAR | Fiberex | 5 |

The bleed through of filler was obvious in some of the ash determinations on sheet splits. Also in the pilot trial, the freeness of the top fibrous layer mixture was measured and found to be nearly 600 Canadian Standard Freeness (CSF). It was hypothesized that increased refining of the fiber used in the top fibrous layer would lead to a better mat of fibers and a more cohesive top fibrous layer. This lack of top fibrous layer refining may explain the lower brightness achieved even with the heavy coverage, compared to the original prototype in Example 1. Note, however, that even the heavy coverage was short of the 28.7 lb/1000 sq. ft. top fibrous layer coverage used in the handsheets of Example 1.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A multi-layer paperboard product comprising a base layer of unbleached cellulose fibers and a top fibrous layer comprised of:
   (a) from about 20% to about 30% by weight of fibers,
   (b) from about 3% to about 10% by weight of a binder, and
   (c) from about 60% to about 90% by weight of a water-insoluble filler wherein said paperboard exhibits a GE brightness of at least 40%.

2. The multi-layer paperboard product according to claim 1, wherein said base layer comprises fiber selected from the group consisting of softwood fibers, hardwood fibers, recycled paper fibers and mixtures thereof.

3. The paperboard product according to claim 1, wherein said base layer comprises greater than 50% by dry weight softwood fibers and varies in weight from about 20 lbs/1000 sq. feet to about 100 lbs/1000 sq. feet.

4. The paperboard product according to claim 1, wherein said top fibrous layer comprises at least 20% hardwood fibers and varies in weight from about 5 lbs/1000 sq. feet to about 17 lbs/l000 sq. feet.

5. The paperboard product according to claim 1, wherein said filler is selected from the group consisting of clay, calcium carbonate, talc, titanium dioxide, silica, zinc oxide, magnesium carbonate, magnesium hydroxide, and aluminum trihydrate.

6. The paperboard product according to claim 1, wherein said filler is clay.

7. The paperboard product according to claim 1, wherein said binder is a latex.

8. The paperboard product according to claim 1, wherein said binder is selected from the group consisting of acrylic latexes, styrene-butadiene rubber latexes, polyisoprene latexes and derivatives thereof, and cationic starches.

9. The paperboard product according to claim 1, wherein said binder is a vinyl acrylic latex.

10. The paperboard product according to claim 1, wherein said top fibrous layer further includes a coagulant in an amount sufficient to make a charge of said top fibrous layer near neutral.

11. The paperboard product according to claim 10, wherein said coagulant is a low molecular weight cationic polymer or a cationic starch, and said coagulant is added in an amount from about 5lbs/ton of top fibrous layer furnish to about 100lbs/ton of top fibrous layer furnish.

12. The paperboard product according to claim 1, wherein said fibrous top fibrous layer further includes a retention aid in an amount from about 2 lbs/ton of top fibrous layer furnish to about 5 lbs/ton of top fibrous layer furnish.

13. The paperboard product according to claim 12, wherein said retention aid is a positively charged polymer.

14. The paperboard product according to claim 12, wherein said retention aid is a negatively charged polymer.

15. The paperboard product according to claim 1 further comprising a coating on a surface of said top fibrous layer, wherein said coating comprising:
  (a) from about 80% by weight to about 90% by weight of a coating filler, and
  (b) from about 10% by weight to about 20% by weight of a coating binder,
  wherein said paperboard product has a GE brightness of at least 65%.

16. The paperboard product according to claim 1, wherein said top fibrous layer varies from about 8 Lbs/1000 sq. feet to about 10 Lbs/1000 sq. feet and comprises:
  (a) from about 22% to about 28% by weight of fibers,
  (b) from about 4% to about 6% by weight of a binder, and
  (c) from about 63% to about 77% by weight of a water-insoluble filler,
  wherein said paperboard sheet exhibits a GE brightness of at least 40%.

17. The paperboard product according to claim 16, vherein said filler is selected from the group consisting of clay, calcium carbonate, talc, titanium dioxide, silica, zinc oxide, magnesium carbonate, magnesium hydroxide, and aluminum trihydrate.

18. The paperboard product according to claim 16, wherein said filler is clay and wherein said binder is a latex.

19. A multi-layered paperboard product comprising:
  (a) a base layer having at least 50% unbleached kraft pulp fibers selected from the group consisting of softwood fibers, hardwood fibers and mixtures thereof and varying from about 20 lbs/1000 sq. feet to about 100 lbs/1000 sq. feet, and
  (b) a top fibrous layer bonded to said base layer, said top fibrous layer varying from about 5 lbs/1000 sq. feet to about 17 lbs/1000 sq. feet and comprising:
    (i) from about 20% to about 30% by weight of fibers,
    (ii) from about 4% to about 6% by weight of a binder selected from the group consisting of acrylic latexes, styrene-butadiene rubber, polyisoprene latex and derivatives thereof, and cationic starches, and
    (iii) from about 60% to about 90% by weight of a water-insoluble filler selected from the group consisting of clay, calcium carbonate, talc, titanium dioxide, silica, zinc oxide, magnesium carbonate, magnesium hydroxide, and aluminum trihydrate.

* * * * *